United States Patent
Lin et al.

(10) Patent No.: US 8,542,642 B2
(45) Date of Patent: Sep. 24, 2013

(54) CHANNEL CONDITION DEPENDENT SCHEDULING

(75) Inventors: Bo Lin, East Kilbride (GB); Wim Rouwet, Br Margraten (NL)

(73) Assignee: Freescale Semiconductor, Inc., Austin, TX (US)

( * ) Notice: Subject to any disclaimer, the term of this patent is extended or adjusted under 35 U.S.C. 154(b) by 286 days.

(21) Appl. No.: 12/997,096

(22) PCT Filed: Jun. 26, 2008

(86) PCT No.: PCT/IB2008/052580
§ 371 (c)(1),
(2), (4) Date: Dec. 9, 2010

(87) PCT Pub. No.: WO2009/156794
PCT Pub. Date: Dec. 30, 2009

(65) Prior Publication Data
US 2011/0085512 A1   Apr. 14, 2011

(51) Int. Cl.
*H04W 72/10* (2009.01)
*H04W 72/12* (2009.01)
*H04L 12/26* (2006.01)

(52) U.S. Cl.
USPC ........ 370/329; 370/252; 455/67.13; 455/450; 455/452.2

(58) Field of Classification Search
USPC ................ 370/328, 329, 252, 330, 335–337, 370/342–343, 319; 455/450, 451, 452.1, 455/452.2, 522
See application file for complete search history.

(56) References Cited

U.S. PATENT DOCUMENTS

| | | | |
|---|---|---|---|
| 6,987,738 B2 * | 1/2006 | Subramanian et al. | 370/252 |
| 7,046,678 B2 * | 5/2006 | Jiang et al. | 370/395.41 |
| 7,272,190 B2 | 9/2007 | Blankenship et al. | |
| 7,289,574 B2 | 10/2007 | Parolari | |
| 7,292,825 B2 | 11/2007 | Beale et al. | |
| 7,372,830 B2 * | 5/2008 | Jung et al. | 370/328 |
| 7,649,960 B2 * | 1/2010 | Raghavan et al. | 375/295 |
| 7,756,483 B2 * | 7/2010 | Chang et al. | 455/67.13 |
| 7,933,350 B2 * | 4/2011 | Liu et al. | 375/260 |
| 8,064,392 B2 * | 11/2011 | Chang et al. | 370/329 |
| 8,184,544 B2 * | 5/2012 | Ko et al. | 370/249 |
| 8,320,395 B2 * | 11/2012 | Pajukoski et al. | 370/431 |
| 2007/0091841 A1 | 4/2007 | Bhushan et al. | |
| 2007/0121547 A1 * | 5/2007 | Huh et al. | 370/329 |
| 2007/0218843 A1 * | 9/2007 | Mizusawa | 455/69 |
| 2007/0286124 A1 | 12/2007 | Grant et al. | |
| 2008/0037464 A1 * | 2/2008 | Lim et al. | 370/329 |
| 2008/0084829 A1 * | 4/2008 | Visuri | 370/252 |

FOREIGN PATENT DOCUMENTS

| | | |
|---|---|---|
| WO | 03/043273 A | 5/2003 |
| WO | 2005/071868 A | 8/2005 |

OTHER PUBLICATIONS

International Search Report and Written Opinion correlating to PCT/IB2008/052580 dated Mar. 30, 2009.

* cited by examiner

*Primary Examiner* — Candal Elpenord

(57) ABSTRACT

An apparatus for data traffic scheduling comprises a scheduler assigning at least one priority parameter value prioritizing usage of a communication resource comprising a plurality of logical channels, to each of a plurality of users of the communication resource, a channel analyzer providing at least one channel condition indicator for each logical channel, and a filter providing a scheduling parameter value for each logical channel to the scheduler determining the priority parameter value, the scheduling parameter value being a weighted average of a plurality of values of the at least one channel condition indicator.

20 Claims, 5 Drawing Sheets

Legend:
0, 1, ... N-1    Stages
20               Channel condition indicator
26               Scheduling parameter value
40, 42, 44       Delay elements
46, 48, 50       Multipliers
52, 54, 56, 58   Adders Legend:
20       Channel condition indicator
26       Scheduling parameter value
62       Delay element
64       Multiplier
66       Adder
68       Divisor

CHANNEL CONDITION DEPENDENT SCHEDULING

FIELD OF THE INVENTION

This invention in general relates to communications systems, and more specifically to an apparatus and method for data traffic scheduling.

BACKGROUND OF THE INVENTION

Communications systems provide an infrastructure allowing different users to send and receive data across communication resources, for example dedicated frequency bands of cable or wireless transmission links. Digital data communication systems allow sharing of a resource between a plurality of users and enable multiplexed data traffic using multiple logical digital channels. However, resources have limited capacity due to limited available bandwidth, attenuation, noise, transmission delay etc. In order to allow a maximum number of users to receive a maximum possible or guaranteed quality of service (bandwidth, delay, maximum bit error rate, etc.), the overall system throughput should be maximised. To maximise system throughput, sometimes it is desired to use channel condition to prioritise traffic flows. That is, a user in a favourable channel condition may be scheduled in preference to the one in less favourable channel condition or may have more traffic to be scheduled out. For example, if two users at the same static priority (static priority is the priority decided by pre-specified parameters, such as Quality of Service (QoS) requirements, channel capacity, and so on), but with different modulation schemes, one on QAM64 (Quadrature Amplitude Modulation, 64 modulation status (6 bits)) and the other on BPSK (Binary Phase Shift Keying), a better throughput can be achieved for the QAM64 user by either scheduling the user first (channel condition dependent prioritisation) or granting more traffic allowance (channel condition dependent bandwidth allocation) to the user. The term "QoS" does not only refer to the actual quality of the provided service, but it also refers to a resource reservation control mechanism allowing a user to obtain a certain service quality from the system.

For non-GBR traffic (GBR: guaranteed bit rate), channel condition dependent prioritisation increases system throughput because those traffic flows with poor channel condition can be de-prioritised. This does not affect their fairness, since only a best effort service is offered. However, for GBR traffic, the de-prioritisation may conflict with fairness requirement. On the other hand, channel condition dependent bandwidth allocation seems to balance GBR traffic's prioritisation and fairness.

For Guaranteed Bit Rate (GBR) traffic, customers pay for QoS (bit rate, latency, jitter, etc.) and they have no idea of or simply don't care about channel condition. De-prioritising a customer with less efficient channel condition may not only affect average bit-rate but does have an impact on latency and jitter. The impact on GBR traffic with latency requirement is explained with the following example: For example, users U1 and U2 pay the same QoS premium and, in a particular transmission time interval (TTI), U1 uses quadrature phase shift keying (QPSK) due to poor channel condition while U2 uses QAM64 for a good channel condition. It is assumed that they have the same amount of traffic to transport, say, 100 bytes. It is also assumed the capacity of a Resource Block (RB) as follows: RB[QPSK]=20 bytes, RB[QAM64]=80 bytes. To schedule 100-byte SDU (service data unit) out, say, a 110-byte MAC PDU (MAC: media access control, PDU: protocol data unit) has to be built. As a result, to hold a 110-byte MAC PDU, U1 needs 6 RBs while U2 only needs 2. By channel condition dependent prioritisation, U2 shall be scheduled ahead of U1 even if it is U1's turn under "static" prioritisation. This decision increases system throughput but it may be unfair to U1 for several reasons. The first is that U1 pays the same QoS premium for the GBR service as U2 does and U1 expects the same service. The second is that U1's traffic may get more delays and in turn more violations on latency and jitter requirements. The third is that U1's GBR may not be guaranteed due to the delay. One may argue that by serving U2 first there is still chance to have U1 served in the same TTI. One may also point out that the average GBR will be honoured by increasing U1's bit rate credit in next TTI and the latency and jitter requirements can be achieved by constraining channel condition dependent prioritisation. However, the main point here is that if U1 gets delayed, its not fair in several accounts while if U1 does not get delayed channel condition dependent prioritisation is not needed since U1 gets served in the TTI anyway. By postponing the service to U1 in the same TTI, it won't increase average system throughput but make scheduling more complicated.

For generic GBR traffic, if there is unlimited buffer space, then the traffic with poor channel condition can be postponed. However, if buffer size is limited, then GBR traffic with arrival bit rate less than GBR will not be guaranteed if a less efficient MCS (Modulation and Coding Scheme which is selected based on channel condition) is applied. This can be shown in the following numerical example. Say, UE1 (UE: User Equipment, such as a mobile phone) is far away from a base station with QPSK. Its GBR is, say, converted into 12 bytes per TTI (96 bits per ms=96 kbps). UE1 of course expects that a 10-byte per TTI (80 kbps) traffic shall get through. If the system provides UE1 with unlimited buffer space, the 10-byte per TTI traffic will get through in some time. However, if, say, the system provides maximum 100K bytes buffer for UE1, in 10 seconds, the buffer will be full and packets will get dropped. This contradicts the GBR service.

For non-GBR traffic, channel condition prioritisation can be used to increase system throughput. However, for GBR traffic, channel condition prioritisation may cause issues on fairness, latency requirements, buffer management etc.

As another example for the need of a fair scheduling, two static users of a wireless communications system, A and B have the same pre-assigned QoS, but A is close to a base station while B is far away from it and therefore its transmission encounters longer delay, more noise, greater attenuation etc. If therefore, in order to maximise overall system throughput, user A is always assigned a higher priority over user B, it is not fair to user B, since both users are static and have the same QoS (and customers may pay the same price).

SUMMARY OF THE INVENTION

The present invention provides an apparatus and a method for channel condition dependent data traffic scheduling as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar objects.

DETAILED DESCRIPTION OF THE PREFERRED EMBODIMENTS

Data traffic scheduling is a key concept for digital communications systems with limited resources for on the one hand, maximising overall system throughput and on the other hand optimising service for users transmitting data, by assigning priorities for using system resources to the users according to their actual needs and/or according to guaranteed quality of service (QoS) parameters. Traffic with favourable channel condition may receive a higher priority compared to traffic with less favourable channel condition, while at the same time other requirements, such as fairness and acceptable latency, may be taken into account, too.

Figure 1:
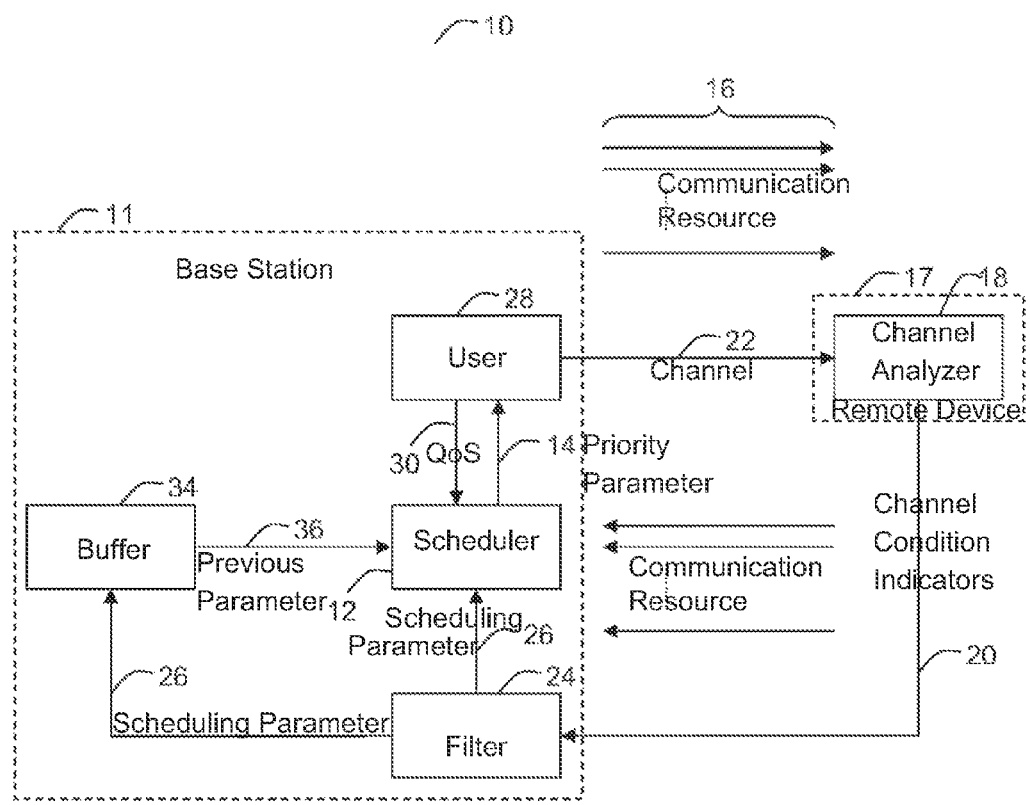
FIG. 1 schematically shows a block diagram of an example of an embodiment of an apparatus for channel condition dependent data traffic scheduling.

Referring to FIG. 1, a schematic block diagram of an example of an embodiment of an apparatus 10 for channel condition dependent data traffic scheduling is shown, comprising a scheduler 12 assigning at least one priority parameter 14 value prioritising usage of a communication resource 16 comprising a plurality of logical channels 22, to each of a plurality of users 28 of the communication resource 16, a channel analyser 18 providing at least one channel condition indicator 20 for each logical channel 22, and a filter 24 providing a scheduling parameter 26 value for each logical channel 22 to the scheduler 12 determining the priority parameter 14 value, the scheduling parameter 26 value being a weighted average of a plurality of values of the at least one channel condition indicator 20.

The channel analyser 18 may be a part of a remote device 17 or UE (user equipment), such as a mobile phone in a wireless communication network, connected to a base station 11, for example an evolved Node B (eNB) base station used in Universal Mobile Telecommunications Systems (UMTS). A user 28 of the communication resource may be any device, for example being comprised in a base station 11, for data communication with the remote device 17 having the channel analyser 18, managing generation, coding and transmission of data across a logical channel 22. A user 28 of the communication resource may also be only a part of a device or using a part of the computational resources of a device, dedicated to a communication with a certain remote device 17. A channel condition indicator 20 is provided by the channel analyser 18 of the remote device 17 and transmitted to the scheduling parameter filter 24 on an uplink connection. The communication resource 16 comprises logical channels being either uplink- or downlink-channels, i.e. either being set up for data transmission from a base station 11 to a remote device 17 or vice versa. In this context, a priority parameter may refer to a parameter adjusting any parameter pre-assigned to a user by a quality of service mechanism being implemented in the communications system. A channel condition indicator may be any parameter characterising an aspect of the current condition of a channel, for example the signal-to-noise ratio on a channel, delay, latency, bit error rate, symbol error rate, available bandwidth, phase shift, signal attenuation, etc.

A sending user 28 transmits data across a logical channel 22 set up within the communication resource 16 of a communications system to a receiving user of a remote device 17. This channel is characterised by its condition at the time t of transmission. Time t in this context is a consecutive queue of equidistant discrete time samples. The condition of a channel may refer to the bit rate, the throughput achieved, the bit error rate during transmission, the transmission delay, the encountered latency, the available bandwidth for transmission, depending on the data transfer protocol used the number of retransmissions of data portions, the amount of lost data packets in a packet oriented communication, the degree of attenuation, the noise on the channel and so on. The channel condition is sensed by a channel analyser 18, which provides a channel condition indicator 20 value for the measured channel at a time t. The embodiment of this device depends on the channel condition being analysed. Although in this specification the functionality of the apparatus 10 for data traffic scheduling is explained based on the evaluation of one channel condition variable, more than one channel condition variables may be used for generating one or more channel condition indicators characterising the channel condition at a certain time t. The current channel condition indicator 20 value is fed into a filter 24. The filter generates a current scheduling parameter 26 value based on a weighted average of the current channel condition indicator 20 value and previous channel condition indicator values buffered within the filter 24. The generated scheduling parameter 26 value is provided to the scheduler 12. Scheduling parameter values may be additionally buffered in a buffer 34 and previous scheduling parameter values 36 may be sent to the scheduler 12 together with the current scheduling parameter value 26. The scheduler 12 receiving the scheduling parameter values for a channel is also provided with a usually static quality of service (QoS) parameter 30 pre-assigned to the user of the logical channel 22 and updates the user 28 with a priority parameter 14 value adjusting the QoS parameter 30 value generated based on the scheduling parameter.

Although one user 28 is shown, a plurality of users may use a plurality of logical channels 22 for data transmission and the scheduler 12 may assign priorities to them, since priorities assigned to one user using a certain channel may affect performance on other channels, because all logical channels share the same communication resource.

In order to allow for a fair scheduling for all users of the communication resource, maximising overall system throughput, providing the guaranteed or best possible service to all users, a channel condition indicator 20 representing the actual condition of a channel 22 in a very dense form is required. Therefore, the channel condition indicator 20 may be a ratio of a signal power to a noise power (SNR: signal to noise ratio) on the logical channel 22. The SNR may be expressed in terms of a logarithmic decibel scale, since signals may have a wide dynamic range.

However, the communication resource may be subject to changing conditions. For example, a communication system having a wireless communication resource and moving mobile users may encounter heavy variation of the measured SNR. Therefore, the scheduling parameter 26 may be a weighted average SNR. This reduces an influence of sudden or short term changes on the scheduling parameter value delivered to the scheduler. By using different weighting factors, the degree of dependency of the filtering result on previous channel conditions can be selected. It is desired that the filter 24 may smooth a variation over time of the channel condition indicator 20. This may be achieved by using a weighted average SNR or by employing a filter having a low pass characteristic.

The filter 24 may be a finite impulse response (FIR) filter. FIR filters are bounded-input bounded-output stable. The impulse response settles to zero in a finite number of sample intervals. This is in contrast to indefinite impulse response filters, which comprise an internal feedback loop and may continue to respond indefinitely.

Figure 2:
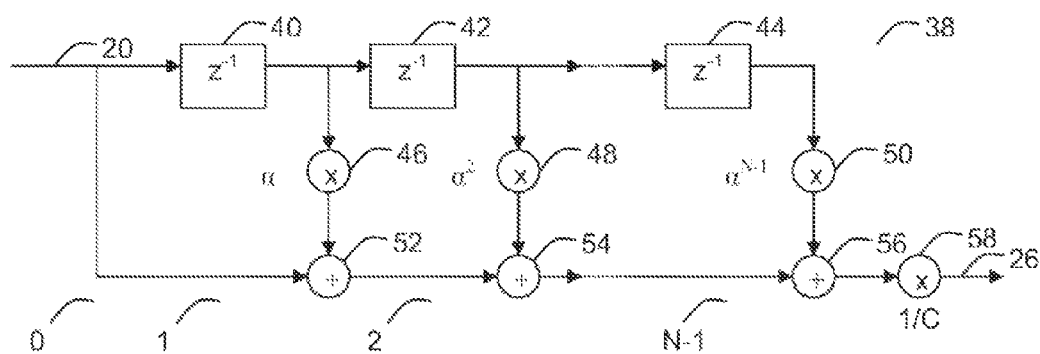
FIG. 2 schematically shows a block diagram of an example of a first embodiment of a weighted moving average filter for channel condition indicator values, having N stages.

Referring now to FIG. 2, the FIR filter may be a weighted moving average filter 38. Therefore, a block diagram of an example of a first embodiment of a weighted moving average filter for channel condition indicator 20 values, having N stages (0, 1, 2, ..., N−1), is shown. It comprises N−1 delay elements 40, 42, 44, N−1 multipliers 46, 48, 50 for multiplying a buffered value with weighting factors corresponding to eq. 1, adders 52, 54, 56 for adding the multiplication result to the input channel condition indicator value, and a divisor 58 for dividing the filter result by a constant C. This N-stage weighted moving average filter 38 is described with the following equations, wherein $y_k$ is the output scheduling parameter 26 value at time k, $x_k$ is the channel condition indicator 20 as input value of the shown filter, and $\alpha$ is a weighting factor.

$$y_k = \left( \begin{array}{c} x_k + \alpha \cdot x_{k-1} + \alpha^2 \cdot x_{k-2} + \ldots + \\ \alpha^{N-2} \cdot x_{k-(N-2)} + \alpha^{N-1} \cdot x_{k-(N-1)} \end{array} \right) / C \quad \text{(eq. 1)}$$

$$\begin{aligned} y_{k+1} &= \left( \begin{array}{c} x_{k+1} + \alpha \cdot x_k + \alpha^2 \cdot x_{k-1} + \ldots + \\ \alpha^{N-2} \cdot x_{k-(N-3)} + \alpha^{N-1} \cdot x_{k-(N-2)} \end{array} \right) / C \quad \text{(eq. 2)} \\ &= \left( \begin{array}{c} x_{k+1} + \alpha \cdot (x_k + \alpha \cdot x_{k-1} + \ldots + \\ \alpha^{N-3} \cdot x_{k-(N-3)} + \alpha^{N-2} \cdot x_{k-(N-2)}) \end{array} \right) / C \\ &= \left( \begin{array}{c} x_{k+1} + \alpha \cdot (x_k + \alpha \cdot x_{k-1} + \ldots + \alpha^{N-3} \cdot x_{k-(N-3)} + \\ \alpha^{N-2} \cdot x_{k-(N-2)} + \alpha^{N-1} \cdot x_{k-(N-1)}) \end{array} \right) / \\ & \quad C - \alpha^N \cdot x_{k-(N-1)}/C \\ &= (x_{k+1} + \alpha \cdot C \cdot y_k)/C - \alpha^N \cdot x_{k-(N-1)}/C \\ &= x_{k+1}/C + \alpha \cdot y_k - \alpha^N \cdot x_{k-(N-1)}/C \end{aligned}$$

Therefore, the following equation can be obtained:

$$y_k = x_k/C + \alpha \cdot y_{k-1} - \alpha^N \cdot x_{k-N}/C \quad \text{(eq. 3)}$$

For N→∞ (x) and α<1, i.e. for continuing accumulation of input values, eq. 3 becomes $$y_k = x_k/C + \alpha \cdot y_{k-1} \quad \text{(eq. 4)}$$

If the input has a limited value, say $x_i$<M, by properly choosing C≧M, $y_k$ converges, as shown in eq. 5:

$$y_k = (x_k + \alpha \cdot x_{k-1} + \alpha^2 \cdot x_{k-2} + \ldots + \quad \text{(eq. 5)}$$
$$\alpha^{N-2} \cdot x_{k-(N-2)} + \alpha^{N-1} \cdot x_{k-(N-1)} + \ldots)/C =$$
$$(x_k/M) + \alpha \cdot (x_{k-1}/M) + \ldots + \alpha^{N-1} \cdot (x_{k-(N-1)}/M + \ldots) \leq$$
$$1 + \alpha + \ldots + \alpha^{N-1} + \ldots = \frac{1}{1-\alpha}$$

Therefore, no overflow will happen.

For example, the scheduling parameter value $y_k$ may be chosen as a weighted average SNR at time t wSNRavg[t] and the current channel condition parameter value $x_k$ may be chosen as the SNR at time t. Then eq. 5 may be written as $$\begin{aligned} wSNRavg[t] &= \left( \sum_{k=t-N+1}^{t} \alpha^{t-k} \cdot SNR[k] \right) / C = \quad \text{(eq. 6)} \\ & \left( \alpha \cdot \left( \sum_{k=t-N}^{t-1} \alpha^{t-k} \cdot SNR[k] \right) + SNR[t] - \alpha^N \cdot SNR[t-N] \right) / C = \\ & (SNR[t] + \alpha \cdot C \cdot wSNRavg[t-1] - \alpha^N \cdot SNR[t-N])/C \end{aligned}$$

Figure 3:
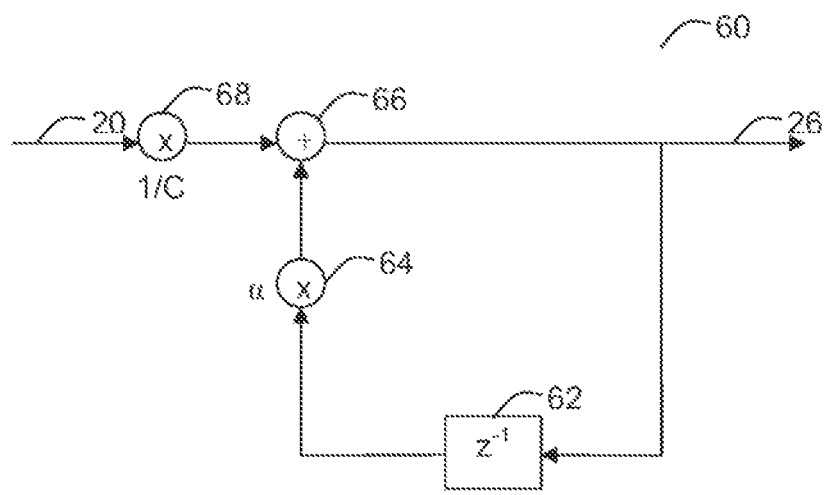
FIG. 3 schematically shows a block diagram of an example of a second embodiment of a weighted moving average filter for channel condition indicator values.

When α is chosen less than 1 and N→∞, the above equation becomes:

$$wSNRavg[t] = (\alpha \cdot C \cdot wSNRavg[t-1] + SNR[t])/$$
$$C = \alpha \cdot wSNRavg[t-1] + SNR[t]/C, \quad \text{(eq. 7)}$$

and a simple filter according to FIG. 3 can be used to replace the filter shown in FIG. 2.

Referring now to FIG. 3, a block diagram of an example of a second embodiment 60 of a weighted moving average filter for channel condition indicator 20 values, is shown. The constant C usually is chosen as 1/(1−α) for α<1.

It is shown, that the current scheduling parameter 26 value may be calculated from the current channel condition indicator 20 and the previous scheduling parameter buffered in a delay element 62 by multiplying the previous scheduling parameter stored in delay element 62 with α using multiplier 64, and adding the result with an adder 66 to the current scheduling parameter 20 value, which is divided by constant C using divisor 68. For the channel condition indicator being the SNR on that channel, a current weighted average SNR may be calculated from the current SNR and the previous weighted SNR.

In an embodiment of the apparatus comprising the scheduler, the priority parameter 14 value may be determined from a current value of the scheduling parameter 26. Depending on the actual parameter used for scheduling, this embodiment provides a smoothing of the variation of priority parameters, but still allows for a strong influence of a change of the current channel condition on an adjustment of the priority parameter 14 value.

Referring to FIG. 1, in another embodiment of the scheduler, the priority parameter 14 value may be determined from a current 26 and at least one previous 36 value of the scheduling parameter. By incorporating previous weighted averages of scheduling parameters, the scheduler provides a stronger smoothing of the variation of priority parameters, reducing the short term influence of a change of the current channel condition on an adjustment of the priority parameter value.

The priority parameter 14 value may be used for adjusting a quality of service (QoS) required bandwidth assigned to at least one of the users 28. The obtained priority parameter 14 value is used to increase or reduce the pre-assigned QoS bandwidth for a user 28 on the logical channel 22 depending on the channel condition. Or bandwidth may be reduced or increased for all other users.

In an embodiment of the apparatus, the priority parameter 14 value may be obtained according to the following function:

allowedBW=qosBW·(1+(wSNRavg[t]−wSNRavg [t−1])/M), (eq. 8)

wherein t is time, allowedBW is an allowed bandwidth allocated in current channel condition, qosBW is a quality of service required bandwidth, i.e. a required bandwidth of user's QoS, wSNRavg[t] is a weighted average SNR at time t, wSNRavg[t−1] is a weighted average SNR at time yt−1, and M is a divisor normalising the difference of wSNRavg[t] and wSNRavg[t−1] to the range between −1 and 1. Therefore, M here may be given by M=|wSNRavg[t]−wSNRavg[t−1]|.

In another embodiment of the apparatus, the priority parameter 14 value may be used as a factor of instant priority for adjusting a quality of service (QoS) required priority assigned to at least one of the users 28. If the user is assigned with a QoS required priority number, this number is adjusted depending on the current channel condition.

One example is an apparatus having a scheduler, wherein the priority parameter 14 value may be obtained according to the following function:

$$\text{instantPri}[t] = \text{qosPri} \| \text{wSNRavg}[t], \quad \text{(eq. 9)}$$

wherein t is time, instantPri[t] is said factor of instant priority at time t, qosPri is said quality of service required priority, and wSNRavg[t] is a weighted average SNR at time t.

The instant priority can be used to prioritise traffic with the same QoS priority. $\|$ is a symbol for concatenation. The function means at time t, the instant priority is a concatenation of the priority specified by QoS (qosPri) and the weighted average SNR. In this way, if two traffic flows have the same qosPri, the one with better average SNR will get scheduled with a higher priority at time t.

The communication resource (16) may be a wireless communication resource. A change of a channel condition is very likely when using a wireless media compared to wired communication resources, for example cable connections. This may be caused by changing ambient conditions, mobility of users, shadow and reflection effects and so on, influencing a transmitted signal. For example, 3GPP LTE, UMTS or any other communication standard employed in a wireless communications system may benefit from the described apparatus allowing an efficient traffic scheduling under changeable channel conditions. Therefore, radio resources may be utilised more efficiently.

Channel conditions and their influence on transmission service quality decide the selection of the modulation and coding scheme (MCS) used on a channel. The presented apparatus is designed to schedule data transmitted using different MCS. Hence, it is possible that at least two of the users (28) may transmit data over the logical channels using different modulation and/or coding schemes. Users may apply any modulation scheme, for example on/off keying (OOK), frequency shift keying (FSK), amplitude shift keying (ASK), phase shift keying (PSK), quadrature amplitude modulation (QAM), minimum shift keying (MSK), continuous phase modulation (CPM), pulse position modulation (PPM), and others. For example, QAM64 (i.e. quadrature amplitude modulation with two carrier waves and 8 different signalling amplitudes per carrier wave) allows for 8·8=64 different signal state, whereas a BPSK, i.e. binary PSK requiring one carrier wave for conveying 2 different signal states. Hence, an MCS dependent scheduling may prefer the user on QAM64 due to the higher achievable bit rate. However, a channel condition dependent scheduling based on, for example, the weighted average SNR on a channel may on the one hand also prioritise the user employing QAM64 for usually better SNR, but on the other hand, prioritise the user on BPSK, if channel conditions are favourable compared to those encountered by the user on QAM64.

Figure 4:
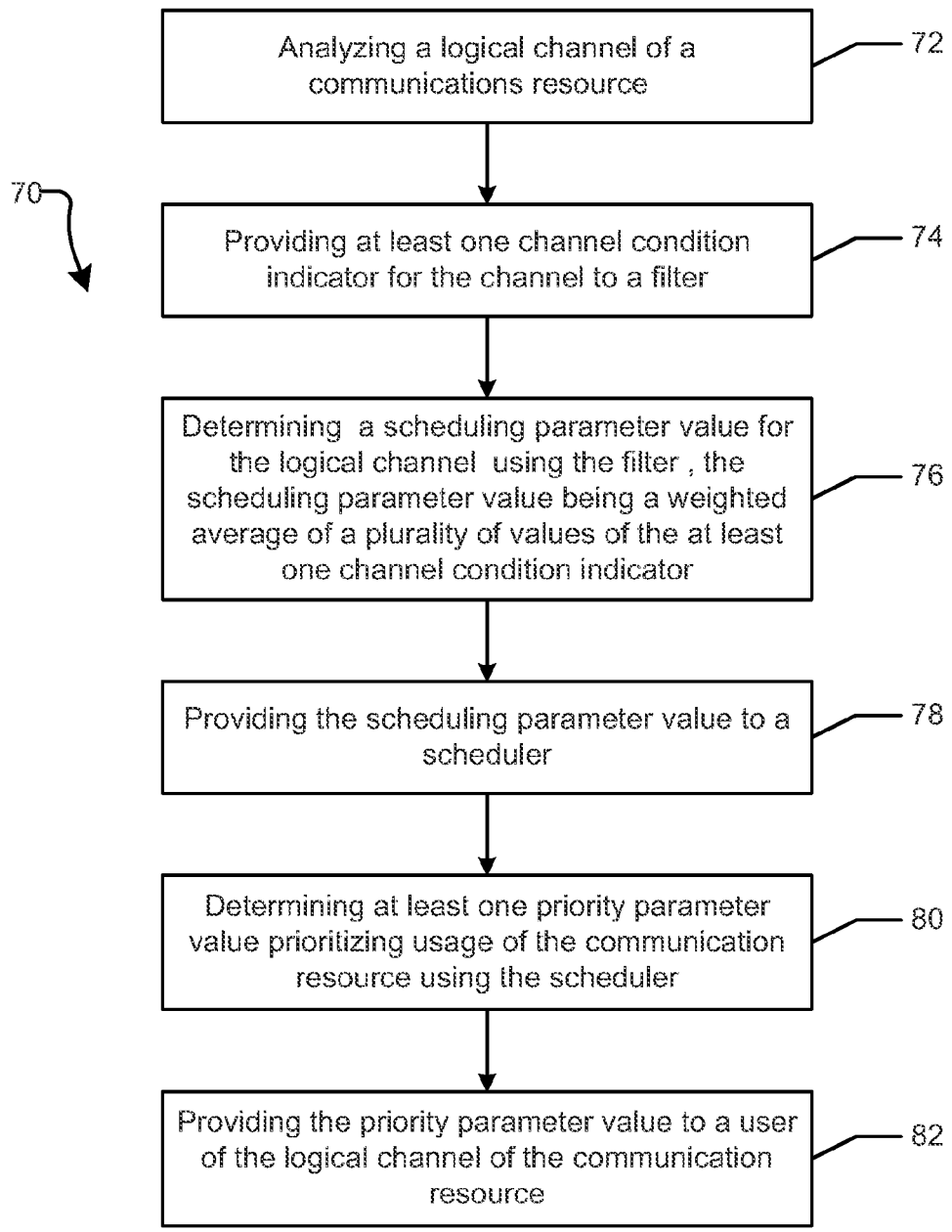
FIG. 4 schematically shows a flow diagram of an example of an embodiment of a method for channel condition dependent data traffic scheduling.

Referring now to FIG. 4, a schematic flow diagram of an example of an embodiment 70 of a method for channel condition dependent data traffic scheduling is illustrated. It comprises analysing 72 a logical channel 22 of a communication resource 16, providing 74 at least one channel condition indicator 20 for the channel 22 to a filter 24, determining 76 a scheduling parameter 26 value for the logical channel 22 using the filter 24, the scheduling parameter 26 value being a weighted average of a plurality of values of the at least one channel condition indicator 20, providing 78 the scheduling parameter 26 value to a scheduler 12, determining 80 at least one priority parameter 14 value prioritising usage of the communication resource 16 using the scheduler 12, and providing 82 the priority parameter 26 value to a user 28 of the logical channel 22 of the communication resource 16. This method may be applied to a plurality or all logical channels and users, consecutively or concurrently. It may be applied repeatedly in order to adjust scheduling over time and take into account changing channel conditions.

A channel condition dependent data traffic scheduling may be implemented in many different technologies and devices, for example as an integrated circuit, in a programmable hardware device, e.g. a field programmable gate array (FPGA), as instructions to be executed by a digital signal processor (DSP), a general purpose processor (GPP), and so on. Therefore, any device for executing steps of a method as described above is a device for channel condition dependent data traffic scheduling.

Moreover, a computer program product may comprise code portions for executing steps of a method for channel condition dependent data traffic scheduling, when run on a programmable device.

Furthermore, a computer program product may comprise code portions for implementing parts of an apparatus for channel condition dependent data traffic scheduling, when run on a programmable device.

Figure 5:
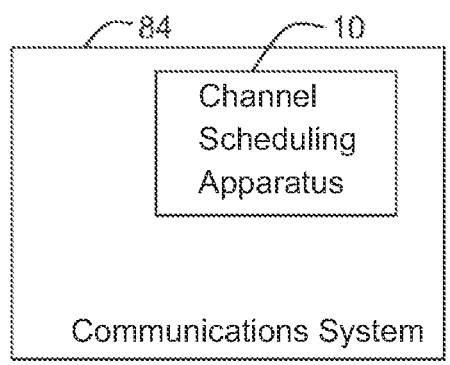
FIG. 5 schematically shows a communications system comprising an apparatus for channel condition dependent data traffic scheduling.

And referring now to FIG. 5, a communications system 84 may comprise an apparatus 10 or a method for channel condition dependent data traffic scheduling as described above.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention can be, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of apparatus 10 are circuitry located on a single integrated circuit or within a same device. Alternatively, apparatus 10 may include any number of separate integrated circuits or separate devices interconnected with each other. For example, apparatus 10 or portions thereof may be soft or code representations of physical circuitry or of logical representations convertible into physical circuitry. As such, apparatus 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of apparatus 10, for example, from computer readable media such as memory or other media on other computer systems. Such computer readable media may be permanently, removably or remotely coupled to an information processing system such as apparatus 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, apparatus 10 is part of a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. An apparatus for data traffic scheduling, comprising:
a channel analyzer providing at least one channel condition indicator for each logical channel of a plurality of logical channels, wherein said channel condition indicator is a ratio of a signal power to a noise power (SNR) on said logical channel;
a filter providing a scheduling parameter value for each logical channel to a scheduler, said scheduling parameter value being a weighted average of a plurality of values of said at least one channel condition indicator, said scheduling parameter being a weighted average SNR; and
the scheduler assigning one or more priority parameter values prioritizing usage of a communication resource comprising the plurality of logical channels, to each user of a plurality of users of said communication resource, wherein:
the one or more priority parameter values for said each user of the plurality of users is based upon the provided scheduling parameter value for a logical channel of the communication resource used by the user; and
a first priority parameter value of the one or more priority parameter values is used for adjusting a quality of service (QoS) required bandwidth parameter assigned to at least one of the plurality of users.

2. The apparatus as claimed in claim 1, wherein said filter is a finite impulse response FIR filter.

3. The apparatus as claimed in claim 2, wherein said FIR filter is a weighted moving average filter.

4. The apparatus as claimed in claim 1, wherein said scheduler is configured to determine said one or more priority parameter values from a current value of said scheduling parameter.

5. The apparatus as claimed in claim 1, wherein said scheduler is configured to determine said one or more priority parameter values from a current and at least one previous value of said scheduling parameter.

6. The apparatus as claimed in claim 1, wherein the adjusted QoS required bandwidth parameter specifies an amount of QoS bandwidth.

7. The apparatus as claimed in claim 6, wherein said apparatus is configured to obtain said first priority parameter value according to the following function:

$$allowedBW = qosBW \cdot (1 + (wSNRavg[t] - wSNRavg[t-1])/M),$$

wherein t is time, allowedBW is an allowed bandwidth allocated in current channel condition, qosBW is a quality of service required bandwidth, wSNRavg[t] is a weighted average SNR at time t, wSNRavg[t−1] is a weighted average SNR at time t−1, and M is a divisor normalizing the difference of wSNRavg[t] and wSNRavg[t−1] to the range between −1 and 1.

8. The apparatus as claimed in claim 1, wherein said communication resource is a wireless communication resource.

9. The apparatus as claimed in claim 2, wherein said scheduler is configured to determine said one or more priority parameter values from a current value of said scheduling parameter.

10. The apparatus as claimed in claim 2, wherein said scheduler is configured to determine said one or more priority parameter values from a current and at least one previous value of said scheduling parameter.

11. The apparatus as claimed in claim 3, wherein said scheduler is configured to determine said one or more priority parameter values from a current and at least one previous value of said scheduling parameter.

12. The apparatus as claimed in claim 4, wherein said scheduler is configured to determine said one or more priority parameter values from a current and at least one previous value of said scheduling parameter.

13. The apparatus as claimed in claim 1, wherein the one or more priority parameter values for said each user of the plurality of users is based upon the provided scheduling parameter value for said each logical channel and based upon at least one previous value of the one or more priority parameter values.

14. The apparatus as claimed in claim 1, wherein the apparatus is to provide to at least one of the plurality of users the one or more priority parameter values for the user.

15. A method for data traffic scheduling, comprising:
analyzing logical channels of a communication resource;
providing at least one channel condition indicator for each logical channel of the logical channels to a filter for the logical channel of the logical channels;
determining a scheduling parameter value for said each of the logical channels using said filter, said scheduling parameter value of said each logical channel being a weighted average of a plurality of values of the at least one channel condition indicator of the logical channel;
providing said scheduling parameter values to a scheduler, determining one or more priority parameter values prioritizing usage of said communication resource for each of a plurality of users of the communication resource using said scheduler, the one or more priority parameter values for a user based upon a scheduling parameter value for a logical channel used by the user;
adjusting a quality of service (QoS) required priority parameter assigned to each of the plurality of users based upon the one or more priority parameter values for the user; and
providing said one or more priority parameter values to said each of the plurality of users of the logical channels of said communication resource, wherein
said channel condition indicator for said each of the logical channels is a ratio of a signal power to a noise power SNR on said logical channel; and
said scheduling parameter for each of the logical channels is a weighted average SNR.

16. The method of claim 15, wherein the adjusted quality of service (QoS) required priority parameter specifies a QoS priority.

17. The method of claim 16, wherein adjusting the QoS required priority parameter comprises applying the following formula:

$$\text{instantPri}[t]=\text{qosPri}\|\text{wSNRavg}[t],$$

wherein t is time, instantPri[t] is said adjusted QoS required priority parameter at time t, qosPri is said quality of service required priority, wSNRavg[t] is a weighted average SNR at time t, and ∥ indicates concatenation.

18. The method of claim 15, wherein the determining the one or more priority parameter values comprises determining the one or more priority parameter values based upon at least one previous value of the one or more priority parameter values.

19. The method of claim 15, wherein the determining the one or more priority parameter values comprises determining the one or more priority parameter values based upon a current value and at least one previous value of said scheduling parameter.

20. A method for data traffic scheduling, comprising:
for each logical channel of a plurality of logical channels, providing by a channel analyzer at least one channel condition indicator, wherein said channel condition indicator is a ratio of a signal power to a noise power (SNR) on said logical channel;
for said each logical channel of the plurality of logical channels, providing by a filter a scheduling parameter value to a scheduler, said scheduling parameter value being a weighted average of a plurality of values of said at least one channel condition indicator of said logical channel, said scheduling parameter being a weighted average SNR; and
assigning by the scheduler one or more priority parameter values prioritizing usage of a communication resource comprising the plurality of logical channels, to each of a plurality of users of said communication resource, wherein:
the one or more priority parameter values for said each user of the plurality of users is based upon the provided scheduling parameter value for a logical channel of the communication resource used by the user; and
a first priority parameter value of the one or more priority parameter values is used for adjusting a quality of service (QoS) required bandwidth parameter assigned to at least one of the plurality of users.

* * * * *